July 22, 1941.  M. G. WESTBYE ET AL  2,250,145
BEARING CLAMP AND FILE GUIDE
Filed Feb. 28, 1940  2 Sheets-Sheet 1

Martin G. Westbye
Fred L. Hoover
INVENTORS

BY Victor J. Evans & Co.
ATTORNEYS

WITNESS

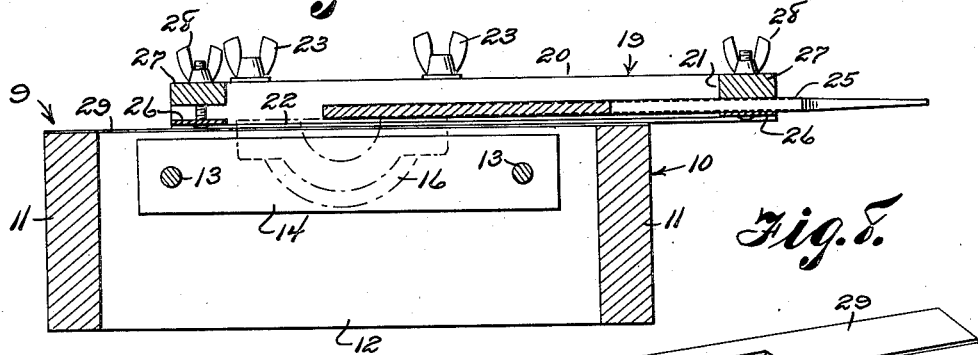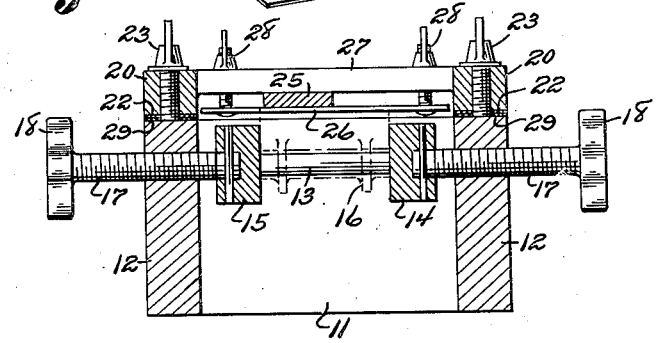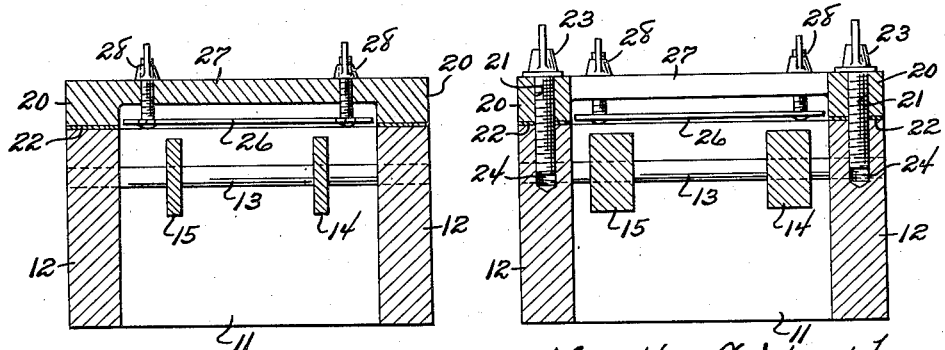

Patented July 22, 1941

2,250,145

UNITED STATES PATENT OFFICE 2,250,145

BEARING CLAMP AND FILE GUIDE

Martin G. Westbye and Fred L. Hoover, Portland, Oreg.

Application February 28, 1940, Serial No. 321,334

5 Claims. (Cl. 29—76)

The present invention relates to improvements in bearing clamps and file guides.

The primary object of the invention resides in the provision of a device of this general character especially designed and adapted for use in the filing and finishing of bearings, and particularly motor bearings.

A further object of the invention is to provide a structure for firmly clamping a bearing therein and having a member slidably dsposed on said structure, carrying a file, said member being manually operated for moving the file across the bearing for filing and finishing the same.

Another object of the invention is to provide a novel and improved mechanism of this general character which includes the use of gauges adapted to be readily inserted and removed for controlling the action of the file upon the bearing whereby an accurate filing of the bearing to the desired size will be obtained.

The invention will be fully and comprehensively understood from a consideration of the following detailed description when read in connection with the accompanying drawings which form a part of the application.

In the drawings:

Figure 4 is a longitudinal sectional vew taken substantially on line 4—4 of Figure 1.

Figure 5 is a transverse sectional view taken substantially on line 5—5 of Figure 1.

Figure 6 is a transverse view taken substantially on line 6—6 of Figure 1.

Figure 7 is a transverse sectional view taken substantially on line 7—7 of Figure 1.

Figure 8 is a perspective view of a thickness gauge of the type employed with the device.

Figure 1:
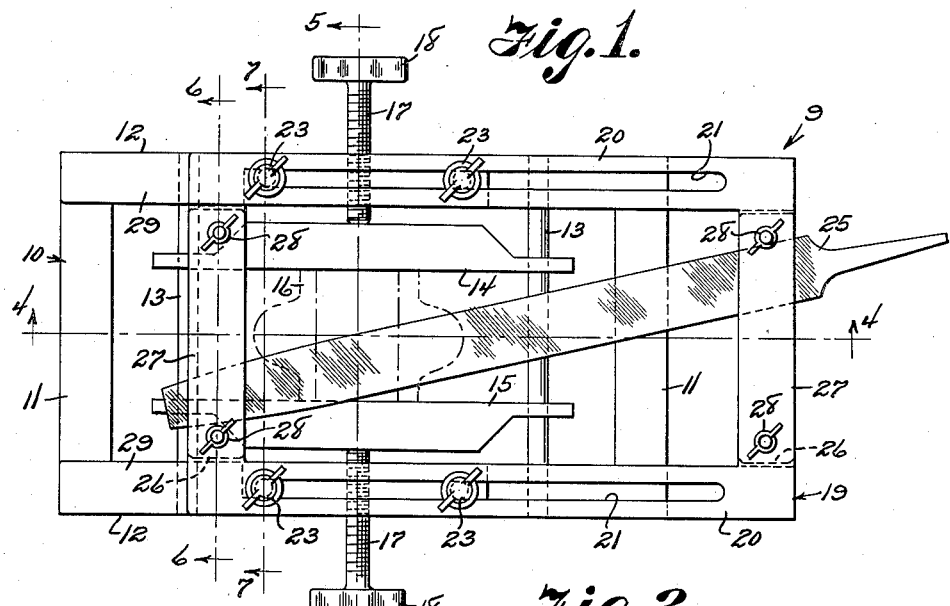
Figure 1 is a top plan view of the improved bearing clamp and file guide as constructed in accordance with the present invention.
Figure 2:
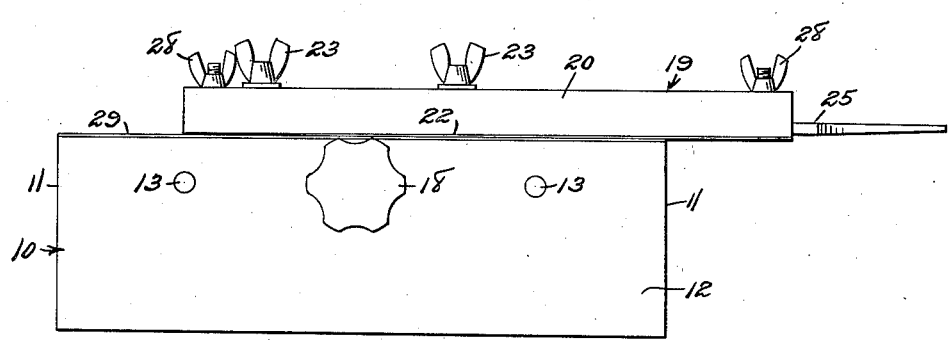
Figure 2 is a side elevational view thereof.
Figure 3:
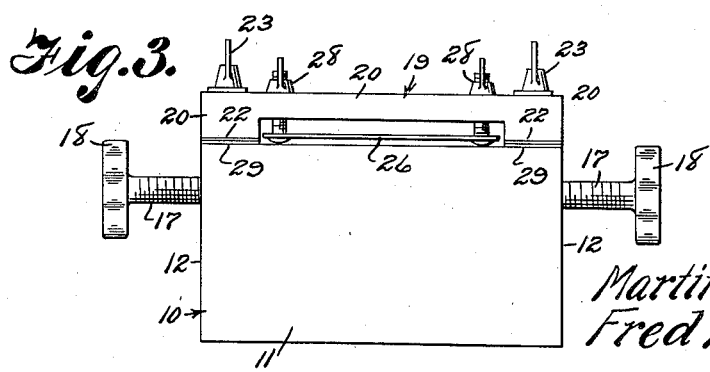
Figure 3 is an end elevational view thereof.

As disclosed in the accompanying drawings, the improved bearing clamp and file guide illustrated in the several views and generally designated by the reference numeral 9 comprises a substantially rectangular-shaped frame 10 including end walls 11 and side walls 12, respectively, said frame being preferably constructed of metal with the side and end walls to be united by any desired means. A pair of rod-like members 13 are disposed transversely of the frame 10 being mounted within the side walls thereof for supporting therebetween jaw plates 14 and 15, respectively, said jaw plates adapted to clampingly engage a bearing 16 to be filed. The ends of said jaw plates are apertured for engagement with the rod-like members 13 for slidable movement thereon. An adjusting screw 17 extends from the central portion of each of the jaw plates and through opposite sides of the frame for adjusting said jaw plates, handle members 18 being formed on each end of said adjusting screws to be actuated when adjusting the jaw plates. This construction is more clearly shown in Figures 1 and 5 of the drawings.

A substantially rectangular-shaped frame 19 is slidably mounted on the upper side edges of the frame 10, the side members 20 thereof being longitudinally slottetd as indicated at 21. If desired, the lower side edges of the frame 19 may be provided with plates 22 serving as a track for effecting easier movement of the frame 19 as it is moved longitudinally of the frame 10 when working upon a bearing supported therein, said plates 22 being riveted or otherwise secured to the lower side edges of the frame 10. Wing-capped stud bolts 23 extend through the slots 21 and enter threaded apertures 24 in the side walls 12 as more clearly shown in Figure 7 of the drawings. The stud bolts 23 when securely fastened will clamp the frame 19 on the frame 10 so as to preclude movement of the former. However, loosening the stud bolts 23 will permit the frame 19 to be moved longitudinally the limit of the slots 21 while retaining the frame 19 in aligned position with the frame 10.

The slidable frame 19 forms a supporting medium for a file 25, the same being held by means of plates 26 attached to the lower side of the end members 27 of said frame. The file 25 is releasably held in position by means of wing-capped stud bolts 28, it being understood that loosening or tightening said bolts will release said file from the holding plates or lock the same thereto. The file may be disposed at an angle as shown in Figure 1 of the drawings in which position it is fixedly held within the clamping plates so as to be movable with the frame 19, or said file may be freely mounted so as to be slidable transversely of the frame depending upon the size of the bearing being worked upon.

Thickness gauge inserts or shims 29 of the type shown in Figure 8 of the drawings are inserted between the respective frames to determine the depth of cut and it will be noted that said insert is notched as indicated at 30 so as to be readily positioned between the frames, the size of the notch corresponding to the distance between the wing-capped studs 23.

In the use of the device, the frame 19 is removed from the frame 10 so that the bearing 16 can be positioned between the pair of jaw plates 14. One or more inserts or shims are then positioned on the upper edges of the side walls of the frame 10 to determine the amount of surface to be removed from the bearing. The slidable frame 19 is then placed over the frame 10 and is locked in position thereon after which the bearing is moved upwardly into contact with the file and the jaw plates tightened so that the bearing will be held firmly against the file. The wing nuts 23 are then loosened and the thickness gauges removed whereupon the frame 19 is manually moved back and forth carrying with it the locked file 25 against the surface of the bearing until the said bearing has been reduced to the desired measurement. It will be readily seen that the file is securely held within the frame 19 so as to permit it to efficiently cut the bearing with a minimum amount of effort. On larger sized bearings, the file can be moved from one side of the frame 19 to the other by releasing the wing nuts 28 which will reduce the clamping tension of the plates 26. It is, of course, to be understood that the file can be held in any position within the frame 19 to obtain maximum performance of the device.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. In a work clamp and file guide having a substantially rectangular-shaped frame with rods extending transversely thereof, a pair of jaw plates mounted for slidable movement on said transverse rods and adapted to clampingly engage a bearing within said frame, a frame mounted for longitudinal movement on said first frame, the side members of said second frame being formed with slots extending longitudinally thereof for receiving means for guiding and limiting the movement of said second frame, and means for mounting a file in said second frame.

2. In a work clamp and file guide having a substantially rectangular-shaped frame with rods extending transversely thereof, a pair of jaw plates mounted for slidable movement on said transverse rods and adapted to clampingly engage a bearing, a frame mounted for slidable movement on said first frame, said second frame comprising side and end members, the side members being formed with slots extending longitudinally thereof, means within said slots for limiting the movement of said second frame, and means for mounting a file in said second frame.

3. In a work clamp and file guide having a substantially rectangular-shaped frame with rods extending transversely thereof, a pair of jaw plates mounted for slidable movement on said transverse rods and adapted to clampingly engage a bearing, a frame mounted for slidable movement on said first frame, said second frame comprising side and end members, the side members being formed with slots extending longitudinally thereof, means within said slots for limiting the movement of said second frame, and means carried by the end members of said second frame for releasably mounting a file therein.

4. In a work clamp and file guide having a substantially rectangular shaped frame with rods extending transversely thereof, work clamping means slidably mounted on said rods within the side walls of said frame, a second rectangular shaped frame supported for longitudinal movement on the upper face of said side walls, the side members of said second frame formed with slots extending longitudinally thereof, means within said slots attached to said first frame for limiting and guiding the longitudinal movement of said second frame, and means for mounting a file on said second frame.

5. In a work clamping and a file guide having a substantially rectangular shaped frame with rods extending transversely thereof, work clamping means slidably mounted on said rods within the side walls of said frame, a second substantially rectangular shaped frame supported for longitudinal movement on the upper face of said side walls, said second frame comprising side and end members, the side members of said second frame formed with slots extending longitudinally thereof, means within said slots attached to the side walls of said first frame for limiting and guiding the movement of said second frame, a plate attached to and spaced from the lower face of each of said end members, said plates and end members adapted to adjustably support a file therebetween, and means for clamping said file between said end members and plates whereby said file will be suspended above said clamping means for engagement with the work held therein.

MARTIN G. WESTBYE.
FRED L. HOOVER.